United States Patent [19]

Thedford et al.

[11] 4,379,440
[45] Apr. 12, 1983

[54] LIVESTOCK SPRAY APPARATUS

[75] Inventors: Dale E. Thedford, Enid; Gil C. Wilson, Kremlin, both of Okla.

[73] Assignee: AG Industries International, Ltd., Enid, Okla.

[21] Appl. No.: 266,162

[22] Filed: May 22, 1981

[51] Int. Cl.³ .................. A01K 13/00; A01K 29/00
[52] U.S. Cl. .................................................. 119/159
[58] Field of Search ................ 119/156, 158, 159, 160

[56] References Cited
U.S. PATENT DOCUMENTS

| 2,480,600 | 8/1949 | Paul, Jr. | 119/159 |
| 2,499,174 | 2/1950 | Turner | 119/159 |
| 2,524,641 | 10/1950 | Suttles, Jr. | 119/159 |
| 2,542,280 | 2/1951 | Knapp | 119/159 |
| 2,595,781 | 5/1952 | Durham | 119/159 |

FOREIGN PATENT DOCUMENTS 1477836  6/1977  United Kingdom ................ 119/159

Primary Examiner—Robert P. Swiatek
Attorney, Agent, or Firm—Robert M. Hessin

[57] ABSTRACT

An improved portable livestock spraying apparatus which includes a chute structure and adjustable guidance structure for directing different sizes of animals through the chute in the presence of surrounding spray coverage of selected medicinal solution. The apparatus includes floor structure for solution filtration which effects three-stage filtering of coarse, fines and final fluid output for recycling to the spray head apparatus.

13 Claims, 7 Drawing Figures

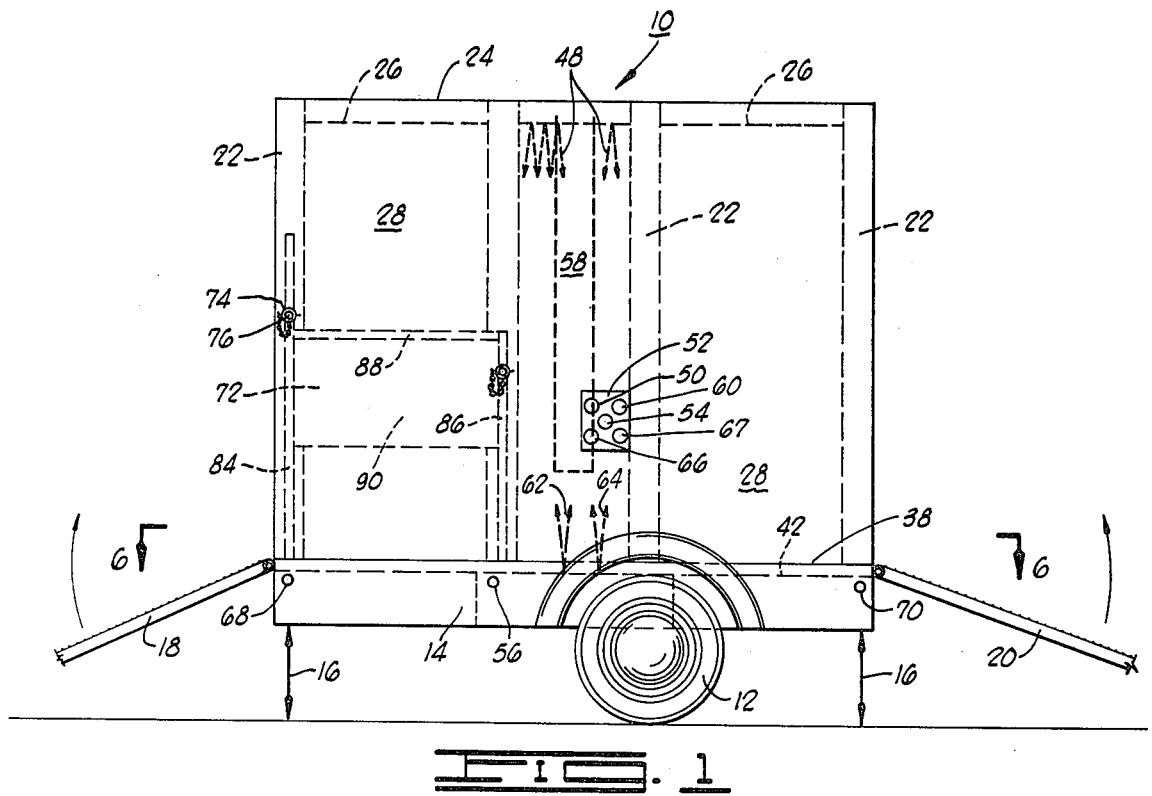
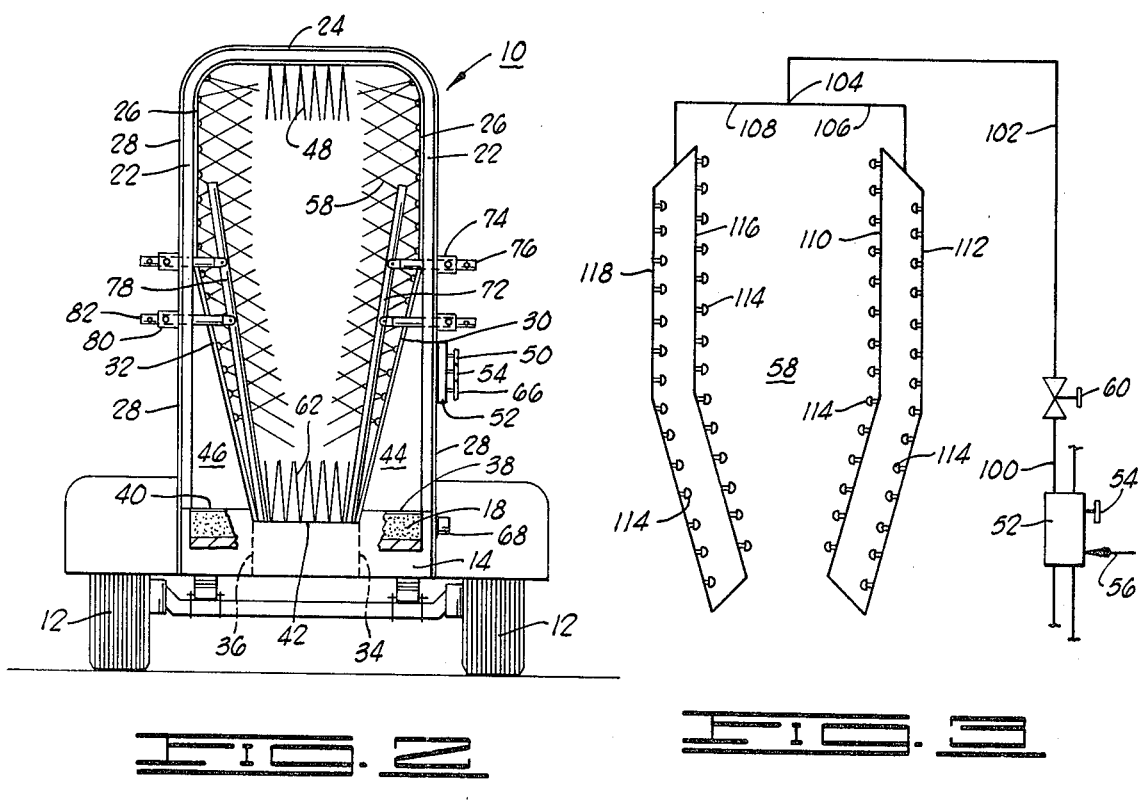

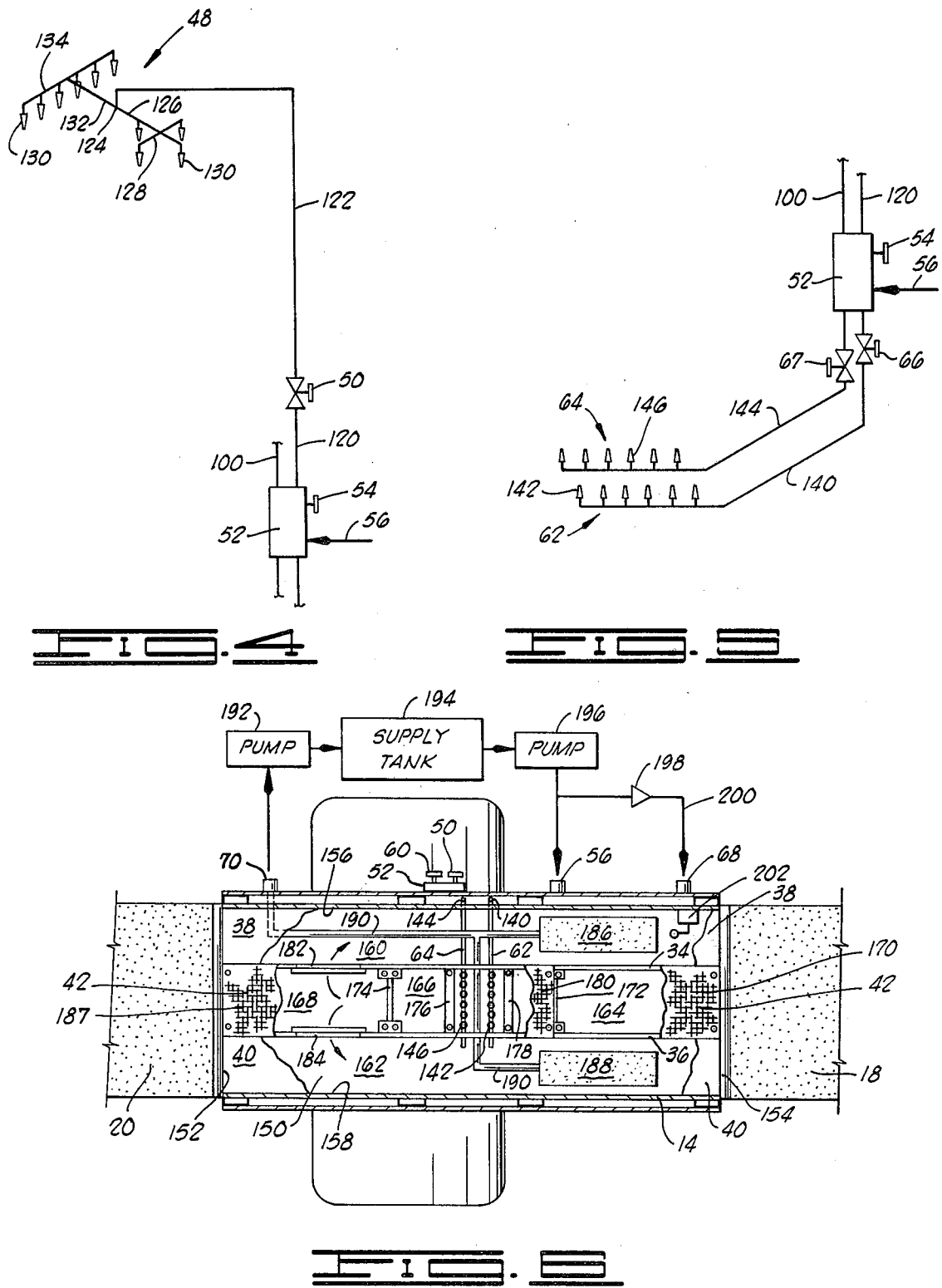

LIVESTOCK SPRAY APPARATUS

BACKGROUND OF THE INVENTION

1. Field of the Invention

The invention relates generally to livestock dipping apparatus and more particularly, but not by way of limitation, it relates to a portable dipping apparatus that includes improved structure relative to spray coverage, solution filtration and solution recycling.

2. Description of the Prior Art

The prior art includes numerous types of livestock dipping apparatus, both portable and stationary, which had as their aim the general function of livestock spraying for control of external parasites. The more modern spraying techniques are an outgrowth of the original teaching of immersing the animals in a trough or pit as such total immersion of the animal has characteristic disadvantages such as the stress factor induced in the animals themselves, respiratory and eye problems that result from total immersion, and the possibilities of actual physical injury to the animal such as broken bones and lacerations. In addition, construction of such troughs and pits is inordinately high in cost for the small livestock producer.

There then developed the chute or pen group spraying using mechanical hand sprayers, and this form of spraying was inefficient in that the animals were not totally covered, and despite lack of coverage the cost of chemical solution is extremely high. Box sprayers are utilized where the animal is locked inside a box unit and drenched under pressure spray in an attempt to get complete solution coverage. Here again, the animal is placed under a more severe stress and there are many attendant respiratory and eye problems caused by the animal's total entrapment within the spray environment. Also, such singular treatment of animals is time-consuming and very expensive due to the required extra labor and loss of chemical solution. There has also developed a class of livestock sprayers which attempt a misting spray over animals passing through a chute enclosure similar to the present invention; however, those units known in the prior art have not had adequate self-contained filtration systems nor sufficient spray pressure and directivity to provide the required penetration of the livestock outer coat.

One patent of interest in the prior art is U.S. Pat. No. 2,529,530 which discloses a livestock sprayer of the portable type having a chute-type spray passage and which includes attendant structure for solution storage and pump supply. This device utilizes a sump tank to catch spray discharge from the chute unit for recycling to the primary solution tank. U.S. Pat. No. 4,165,715 discloses a different form of individual livestock spraying apparatus which is designed to place the animal in the spray attitude prior to spraying so that the animal will be entrapped and be sprayed as it backs out of the device. Finally, U.S. Pat. No. 3,949,709 discloses another form of portable chute unit which includes areal spray means and the attendant solution control equipment. This apparatus includes an actuating arm triggered by the animal moving through the chute structure to maintain spray coverage.

SUMMARY OF THE INVENTION

The present invention relates to improvements in construction and operation of portable livestock spraying apparatus. The apparatus of the present invention includes improved chute structure that is more safely adjustable for different sizes of animals and that lessens the likelihood that horned animals will get racked up within the chute structure. The device also includes a more complete and surrounding spray coverage with individual control of the top and bottom jets and the side sprays; and, the apparatus includes a floor structure for solution filtration and recycling which functions efficiently to remove extraneous matter such as dirt, stones, hair and excretions while collecting the majority of the solution not carried out on the animal for reentry to the spray pump reservoir.

Therefore, it is an object of the present invention to provide a livestock sprayer which more completely and safely wets the animal with chemical solution.

It is also an object of the present invention to provide a portable spray unit capable of functioning for differing sizes of livestock from sheep to the largest cattle in mass file order.

It is still further an object of the present invention to provide a livestock sprayer capable of handling animals in mass file order while completely wetting the animal with spray solution.

Finally, it is an object of the present invention to provide a livestock sprayer which is capable of obtaining a totally effective spray upon more animals per unit time.

Other objects and advantages of the invention will be evident from the following detailed description when read in conjunction with the accompanying drawings which illustrate the invention.

BRIEF DESCRIPTION OF THE DRAWINGS

FIG. 1 is a view in side elevation of a livestock sprayer constructed in accordance with the present invention, showing selected interior elements in dash-line;

FIG. 2 is an entry end view in elevation of the sprayer apparatus of FIG. 1;

FIG. 3 is a schematic illustration of the side spray assembly of the invention;

FIG. 4 is a schematic illustration of the top spray assembly of the invention;

FIG. 5 is a schematic illustration of the bottom spray assembly of the present invention;

FIG. 6 is a horizontal section as taken along line 6—6 of FIG. 1; and

DETAILED DESCRIPTION OF THE INVENTION

Figure 7:
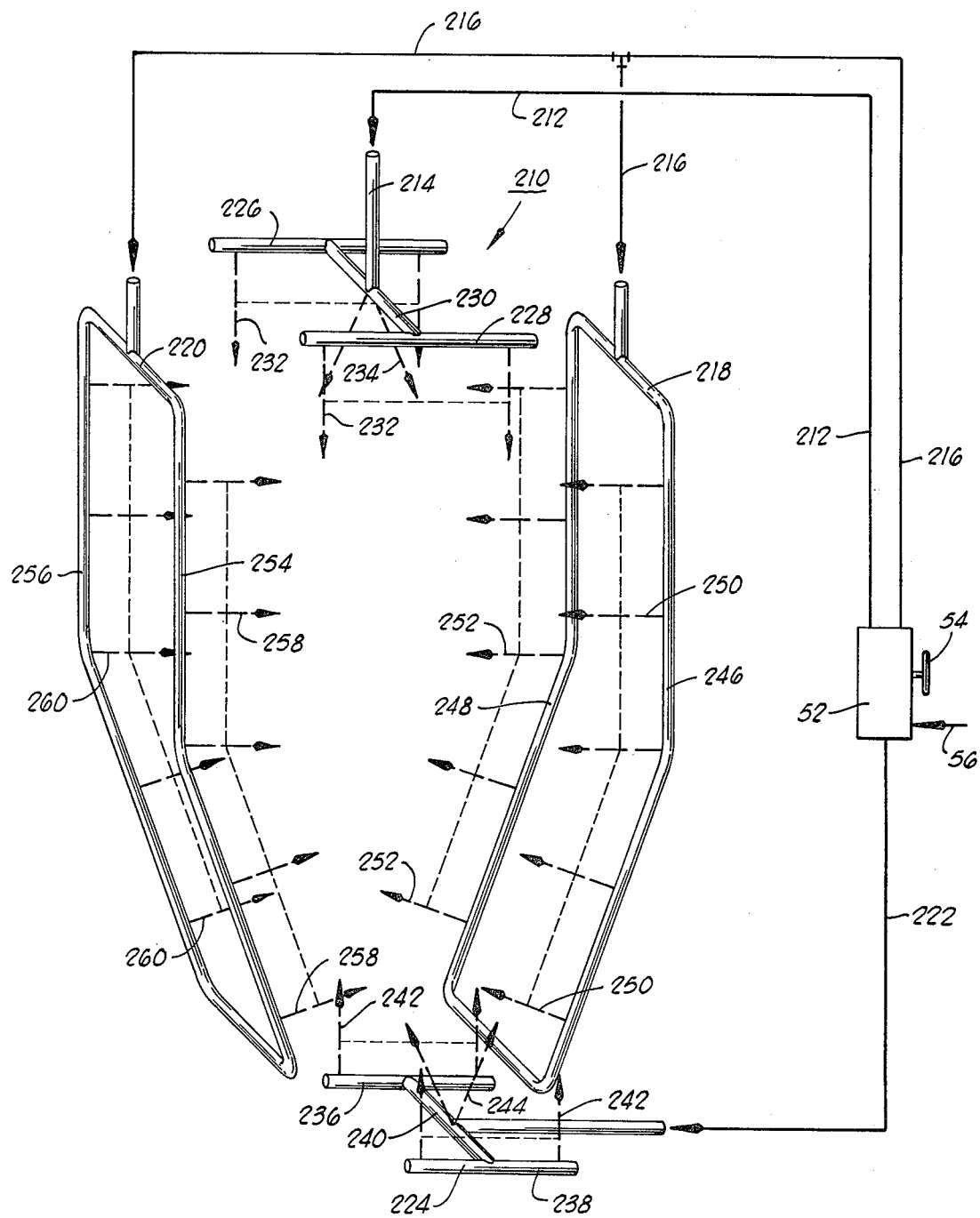
FIG. 7 is a partial schematic illustration of an alternative form of spray structure for the invention.

Referring to FIGS. 1 and 2, a livestock sprayer apparatus 10 is portable in character by virtue of wheels 12 as supported beneath chassis frame 14. The sprayer apparatus 10 may be operatively positioned at a work location using suitable four-corner support jacks such as shown generally by arrows 16. Alternatively, the wheels 12 may be carried on a known type of rotational axis assembly which will allow the chassis frame 14 to be lowered entirely onto the ground during work operations. Opposite ends of the chassis frame 14 carry treaded ramp plates 18 and 20 in pivotal attachment to provide entry and exit ways for the livestock in process.

The chassis frame 14 is of rectangular metal construction, as will be further described below, and includes a plurality of inverted U-shaped channel members 22 spaced along the length thereof to provide upper rigidity to a chute housing assembly 24. The chute housing assembly 24 is completed with an inner skin paneling 26 and an outer skin paneling 28 as suitably secured to the respective inner and outer edges of channels 22. The panels 26, 28 may be formed from selected gauge sheet metal as riveted, fastened, or otherwise secured to the channel members 22. The space between the inner and outer panels 26 and 28 provides space for mounting of spray assemblies and connecting pipe segments, as will be further described below.

Referring primarily to FIG. 2, oppositely disposed lower side panels 30 and 32 are disposed along the length of sprayer apparatus 10 to extend angularly upward to narrow the chuteway for animal passage. The respective lower side panels 30 and 32 are suitably affixed along the inner skin panel 26 on either side and they extend downward to be secured over longitudinal separating panels 34 and 36 within chassis frame 14, as will be further described. Thus, the chassis frame 14 carries a floor plate 38 that is secured in water-tight affixure to longitudinal plate 34, as well as an opposite floor plate 40 secured in water-tight manner to longitudinal plate 36. A central ramp assembly 42 is secured to extend therebetween, as will also be further described. The lateral void space between lower side panels 30 and 32 and the respective channel support structures may be covered by suitable end panels 44 and 46, secured as by welding, to prevent animal entanglement during processing.

The top spray locations are shown generally by sprays 48 as these are located between the inner and outer skin panels 26 and 28 to project through inner panel 26 midway along the sprayer apparatus 10. A separate control valve 50 on side control panel 52 provides control of top sprays 48. A main control valve 54 provides control of the main solution input from hose connector 56 to the various spray assemblies. The side spray 58, shown generally as a dash-line area in FIG. 1, is controlled by a control valve 60, and a pair of transversely aligned bottom sprays 62 and 64 are separately controlled by respective control valves 66 and 67. Three separate unit hose connectors are utilized in the system: the primary solution connector 56 as connected to the primary solution tank; an input connector 68 which is connected to a primary solution liquid holding tank; and an output hose connector 70 as connected to a pump drawing filtered recycle solution from the mid-water filters of the system, as will be further described below.

The entry end of the sprayer apparatus 10, i.e., adjacent forward ramp 18, includes gate structure for adjusting the cross-sectional animal entry area in accordance with the type and size of livestock being processed. As shown in FIG. 2, a laterally adjustable gate 72 is supported by hinges or the like on one edge of floor plate 42 and is laterally adjustable at its upper extremities by means of key locks, consisting of pipes 74 in coaction with reciprocating rods 76, as may be adjustably keyed to the desired lateral spacing. In like manner, a similar gating structure 78 is deployed with pipes 80 and keyed locking rods 82. More particularly, and referring to FIG. 1, the gating structures consist of a front support tubing 84, a shorter rear support tubing 86, a longitudinal interconnecting support tubing 88 and an expanse of rub panel 90 of medium gauge sheet metal suitably secured thereon.

FIG. 3 illustrates the side spray assembly 58 of the sprayer apparatus 10. Primary spray solution is pumped in from a supply tank and input at hose connector 56 to control box 52 as controlled by main valve 54. Solution output from main control 52 on line 100 is controlled by side spray valve 60 to flow by a tubing 102 to a T-connector 104 and opposite side tubes 106, 108 which supply the opposite side parallel spray lines. Tubing 106 is T-connected to a pair of tubes 110 and 112 each having a plurality of spray heads 114 fixed therealong. In like manner, the opposite side distribution tube 108 is connected to parallel-disposed tubes 116 and 118, each of which has a plurality of spray heads 114 fixed therealong. Drain cocks (not shown) may be supplied at the bottom end of the side spray tubing loops.

Referring to FIG. 4, the top spray assembly 48 is also enabled from main distribution box 52 and main control valve 54. Thus, spray solution is conducted by a connector 120 through top spray control valve 50 whereupon tubing 122 is led up through the skin panels to terminate central of the roof portion of apparatus 10 at a T-connector 124. T-connector 124 then connects to a distribution tube 126 which is connected to a cross-array 128 of jet sprays 130. The cross-array 128 of jet sprays 130 is located in the center of apparatus 10 but slightly toward the entry end of the sprayer apparatus in the lateral center. A second distribution tube 132 is connected to a transverse array 134 of jet sprays 130 as it is positioned nearer the exit end of spray apparatus 10. The spray jets 130 are commercially available type of solution spray heads of the jet-type which concentrate greater spray pressure within a lesser area, i.e., relative to such as spray heads 114 (FIG. 3).

FIG. 5 illustrates the lower spray arrays 62 and 64 as each is disposed in transverse arrays at the central floor of sprayer apparatus 10, and each is separately controllable by respective valves 66 and 67. Thus, valve 66 is connected via tube 140 to the entry end array 52 having jet sprays 142, and control valve 67 is connected via tubing 144 to the exit end array 64 having jet sprays 146. In present design, each row of side spray tubes contains fourteen equally-spaced spray heads disposed therealong (FIG. 3). In FIG. 4, the entry end or cross-array 128 includes 4 jet heads 130 while the rearward or lateral array 134 includes six equally-spaced jet heads 130 thereacross. Each of the transverse bottom sprays 62 and 64 (FIG. 5) also includes six equally-spaced jet heads 142, 146. All spray and jet heads are mounted protectively within the structure of apparatus 10 to project through floor and inner panel members.

FIG. 6 illustrates the inner workings of chassis frame 14 which is a compartmented combination of filtered solution tanks and a centrally located filter section. Chassis frame 14 is generally constructed of a bottom panel 150, end panels 152 and 154, and side panels 156 and 158 which are weld-constructed to be fluid-tight and form a reservoir-type base frame for the sprayer apparatus 10. The upper panel is formed by opposite side floor plates 38 and 40 disposed on either side of vertical separator plates 36 and 34 as a central ramp assembly 42 extends down through the middle thereof. Thus, the opposite side enclosed volumes form liquid holding tanks 160 and 162 extending along the length of the chassis frame 14 while the central section is divided into a three-stage filtration tank comprised of a coarse particles section 164, a fines filtration section 166 and a final filtration section 168. Each of the three equi-length filter sections are covered over by a removable grating or ramp floor 42 in separate sections as they are screw-fastened over the serial filter sections.

Each of the ramp floor plates is formed of a suitable expanded or grate-constructed metal plating that is of sufficient strength yet easily handled and cleaned for placement over the respective filter sections. Thus, coarse filter section 164 at the entry end of spray apparatus 10 is covered over by grating 170 as it extends from the entry end, central area, back to a first solid baffle plate 172 extending in fluid-tight affixure between opposed longitudinal plates 34 and 36. Coarse filtration section 164 is provided to entrap coarser materials such as mud, excrement and other exterior materials as might be brought in by the animals in process. The next filter section 166 extends along the center from the solid baffle plate 172 to a corrugated baffle plate 174 and includes the bottom spray assemblies 62 and 64 directed therethrough. A pair of strengthening bars 176 and 178 provide support of mid-filter grating 180 to prevent flexing damage to the lower spray assemblies 62 and 64. The final filter section 168 extends from the corrugated filter plate 174 to the solid end plate 152, and includes flow-through screens 182 and 184 within respective longitudinal plates 34 and 36. A final filter grating 187 is then fastened over filter section 168. Thus, the finally filtered recycle spray solution from final filter 168 is allowed to flow through opposite side screens 182 and 184 into the respective holding tanks 160 and 162.

The filtered spray solution within holding tanks 160 and 162 may then be recycled through the spray apparatus as it is drawn from water filters 186 and 188 through pipe 190 and hose connector 70 to auxiliary pump 192 for input to spray solution supply tank 194. Main supply of spray solution from supply tank 194 is carried out by pump 196 as input through main hose connector 56, while initial priming of the system is carried out through a flow restrictor 198 and input line 200 to hose connector 68, as will be further described. Priming input through hose connector 68 is level-controlled by a float control valve 202.

In operation, the sprayer apparatus 10 may be moved on site adjacent the livestock pens containing animals to be treated whereupon the unit may be placed in desirable position to an adjacent chute or face for entry of animals to be processed. Pump 196 may then be actuated to initiate priming input via line 200 through hose connector 68 to fill the holding tanks 160 and 162 with spray solution. Thereafter, float control valve 202 can function to maintain the holding tanks 160 and 162 at a sufficient solution level as mass livestock processing continues. Main valve 54 may then be opened with selective opening of top valve 50, side spray valve 60 and bottom spray valves 66 and 67, depending upon the type of animals being processed and the particular degree of hair growth, matting, dirt cover, and the like. When sprays have been set as desired, the animals may be processed through sprayer apparatus 10 with the assured spray coverage.

The animal entry gates 72, 78 are each initially set for the breadth of the average animal being processed, whether it be sheep, cattle or other animal, and the adjustment of spray power and selection of sprays as between bottom, top, side and combinations thereof are also selected to provide adequate coverage of the animal upon passage through apparatus 10. Solution spray missing the animal or dripping from the animal is then collected through ramp floor 42 and its central filtration states 164, 166 and 168 for recycling through screens 182 and 184 into holding tanks 160 and 162. Liquid spray from the holding tanks 160 and 162 is then drawn through the mid-water filters 186 and 188 via pump 192 for reentry to the primary supply tank 194. The position and pressures of the selected sprays are such as to ensure complete coverage and penetration of the solution sprayed on the coat of the animal while moving non-stop through the sprayer apparatus 10.

FIG. 7 represents another form of spray structure 210 which may be employed in the present invention with little or no sacrifice in efficiency yet considerable savings in cost of construction. The spray structure 210 utilizes pipes and spray holes to eliminate the jet and spray heads, and spray control is simplified by centering operative control at the main valve 54 controlling primary solution input at connector 56. Thus, enabled spray solution is distributed by tube 212 to the top spray array 214, by tube 216 to opposite side arrays 218 and 220, and by tube 222 to bottom spray array 224.

The top spray array 214 may be suitably mounted within the inner skin panel to include lateral pipes 226 and 228 as interconnected by a longitudinal pipe 230. Jet spray is effected through a plurality of drilled holes, e.g., two inch spacing, in each of tubes 226 and 228 as indicated generally by inner-directed arrows 232. The longitudinal pipe 230 may also include a series of angularly offset holes for directing solution spray as indicated by arrows 234. The bottom spray array 224 is similarly constructed to include lateral pipes 236 and 238 as interconnected by longitudinal pipe 240. Plural spaced longitudinal holes are provided to direct solution as generally indicated by spray lines 242 and plural divergent spray lines 244 emanate from spaced holes along pipe 240. The angularly divergent spray lines 244 are especially important for their contribution in wetting the underleg portions of animals in process.

Side spray array 218 is formed of two parallel and interconnected pipes 246 and 248, each formed with spray holes to direct solution spray as indicated generally by spray lines 250 and 252. In present design, hole spacing is at two inch centers along pipes 246 and 248 but staggered in vertical level to provide one inch coverage on animals passing through the sprayer apparatus. The opposite side array 220 is similarly constructed with parallel pipes 254 and 256 providing inward directed sprays shown generally by arrows 258 and 260. Here again, hole spacing is two inches per pipe but desirably offset in one inch staggered relationship.

Spray holes may be formed simply by drilling suitable diameter holes in the distributor pipes of the arrays. For example, an average diameter hole of approximately 0.035 inch provides good spray pressure throughout the chute housing with input pressures between 35 and 45 PSI. Further, simplified operation is enabled by controlling operation with main valve 54 in a basic start-stop function. It is advantageous to keep the spray hole diameter larger than the porosity filtration limit of the recycle filters 186 and 188 to avoid clogging problems that could arise from recycle solution.

The foregoing sprayer apparatus provides a safe and economical structure for treatment of livestock for external parasites, and the design is particularly directed to an apparatus for economically and efficiently spraying solutions onto livestock for the control of parasites such as flies, ticks, grubs, lice and the like. The apparatus enables increased speed of mass livestock processing while also enabling optimum recapture and recycle of spray solution. The particular form of spray coverage and the selectivity enabled by individual controls for location and directivity of spraying bring about particularly desirable features for treatment of differing sizes, breeds and types of animals.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for livestock spraying which functions with a source of spray solution, comprising:
    chute housing means having opposite sides and roof portions and defining a longitudinal chute way from a livestock entry end to a livestock exit end;
    chassis frame means affixed to and supporting opposite sides of said chute housing means;
    solution spray means disposed longitudinally centrally within said chute housing means and directed across said chute way;
    plural sector filter tank means having a perforate grating thereover and being formed as first sector means disposed at the livestock entry end for entrapment of solid waste, a second sector means disposed generally longitudinally centrally in baffled communication with said first sector means for primary collection of recycled solution, and third sector means disposed adjacent the livestock exit end in screen filter communication with said second sector means;
    at least one holding tank formed as a fluid-tight longitudinal receptacle integral with said chassis frame means and disposed laterally adjacent to said filter tank means in screen filter communication with said third sector means;
    means conducting solution from said at least one holding tank to said source; and
    means conducting solution from said source to said solution spray means.

2. Apparatus as set forth in claim 1 wherein said at least one holding tank comprises:
    first and second holding tanks disposed on opposite sides of said filter tank means; and
    first and second filter screens disposed to allow solution flow from said filter tank means to each of said holding tanks.

3. Apparatus as set forth in claim 1 wherein said means conducting solution from said at least one holding tank comprises:
    at least one solution filtration means disposed within each at least one holding tank adjacent the entry end; and
    conduit means including pump connecting said filtration means to said source.

4. Apparatus as set forth in claim 1 wherein said solution spray means comprises:
    a main control valve;
    top spray means disposed centrally in the top of said chute housing means and connected to said main control valve;
    side spray means disposed centrally on each side of said chute housing means and connected to said main control valve;
    bottom spray means disposed centrally in said chassis frame means and connected to said main control valve; and
    valve means individually controlling solution conduction to each of said top spray means, side spray means and bottom spray means.

5. Apparatus as set forth in claim 4 which is further characterized in that:
    said top spray means and said bottom spray means each include plural jet spray heads; and
    said side spray means each include plural spray heads of wide diameter coverage.

6. Apparatus as set forth in claim 4 wherein said top spray means comprises:
    distribution tube means disposed adjacent the top of said chute housing means;
    a first cross-array of jet heads affixed to said tube means at a position toward the entry end of said chute housing means; and
    a second linear transverse array of jet heads affixed to said tube means at a position toward the exit end of said chute housing means.

7. Apparatus as set forth in claim 4 wherein said side spray means comprises:
    two parallel, interconnected distribution tubes disposed on each side of said chute housing means and extending generally vertically therealong; and
    plural spray heads affixed along each of said distribution tubes in generally equi-spaced distribution.

8. Apparatus as set forth in claim 4 wherein said bottom spray means comprises:
    two parallel distribution tubes aligned in proximation transversely across said central chassis frame means, each having plural jet heads affixed thereacross; and
    means for enabling solution conduction to a selected one of said two parallel distribution tubes.

9. Apparatus as set forth in claim 4 which is further characterized to include:
    first and second laterally adjustable rub panels disposed on opposite sides of the entry end of said chute housing means to define size of livestock entry and to prevent livestock backup.

10. Apparatus as set forth in claim 1 wherein said solution spray means comprises:
    plural distribution pipes each having a plurality of apertures formed therein for direction of spray across said chute way.

11. Apparatus as set forth in claim 10 which is further characterized in that:
    a top spray means is formed as two parallel transverse pipes each having said apertures formed thereacross.

12. Apparatus as set forth in claim 10 which is further characterized in that:
    first and second side spray means in laterally opposed disposition are each formed as a pair of vertical parallel pipes having said apertures formed therealong.

13. Apparatus as set forth in claim 10 which is further characterized in that:
    a bottom spray means is formed as two parallel transverse pipes each having said apertures formed thereacross, and a control interconnecting pipe disposed normally to each transverse pipe and including apertures directing upward spray at a transversely acute angular deviation from vertical of said chute way.

* * * * *